United States Patent
Wang

(10) Patent No.: US 10,298,827 B2
(45) Date of Patent: May 21, 2019

(54) SHOOTING METHOD AND MOBILE DEVICE

(71) Applicant: Huawei Technologies Co., Ltd., Shenzhen, Guangdong (CN)

(72) Inventor: Kongqiao Wang, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 15/557,005

(22) PCT Filed: Oct. 13, 2015

(86) PCT No.: PCT/CN2015/091814
§ 371 (c)(1),
(2) Date: Sep. 8, 2017

(87) PCT Pub. No.: WO2017/063133
PCT Pub. Date: Apr. 20, 2017

(65) Prior Publication Data
US 2018/0213136 A1      Jul. 26, 2018

(51) Int. Cl.
*H04N 5/232*          (2006.01)
*G06F 3/01*           (2006.01)
(Continued)

(52) U.S. Cl.
CPC .......... *H04N 5/232* (2013.01); *G06F 3/016* (2013.01); *G06F 3/0414* (2013.01);
(Continued)

(58) Field of Classification Search
CPC ............. H04N 5/232; H04N 5/23216; H04N 5/23245; H04N 5/772; H04M 2250/52;
(Continued)

(56) References Cited

U.S. PATENT DOCUMENTS 9,106,820 B1 *   8/2015   Hammendorp ........ H04N 5/232
2010/0251101 A1  9/2010   Haussecker et al.
(Continued)

FOREIGN PATENT DOCUMENTS

CN    101854560 A    10/2010
CN    103167179 A    6/2013
(Continued)

OTHER PUBLICATIONS

Windows central; "How to enable'Living Images' on your Nokia Lumia with Windows Phone 8.1"; youtube.com; Jun. 6, 2014; XP054978319; Retrieved from the Internet:URL:https://www.youtube.com/watch?v=RX7vpoFy1Dg; 1 page.
B. Kronfli; "What is HTC Zoe? Know Your Mobile"; XP055292390; Aug. 17, 2014; 4 pages.
Chinese Office Action issued in Chinese Application No. 201580028599.2 on Mar. 1, 2019, 16 pages.

*Primary Examiner* — Lin Ye
*Assistant Examiner* — Chriss S Yoder, III
(74) *Attorney, Agent, or Firm* — Fish & Richardson P.C.

(57) ABSTRACT

A shooting method and a mobile device are used to resolve a technical problem in shooting new visual media such as a Living Image by operating a shooting button, so as to simplify a shooting operation of the new visual media, such as the Living Image, that is different from a picture and a video. In some feasible implementation manners of the present invention, the method includes: starting video shooting on a shooting screen when a long press event of a shooting button is received; and when the long press event ends, if a long press period of the shooting button does not exceed a first set threshold, completing mixed visual media shooting, where the mixed visual media includes one video clip and at least one static picture.

11 Claims, 7 Drawing Sheets

(51) Int. Cl.
  *H04N 5/77* (2006.01)
  *G06F 3/041* (2006.01)
  *G06F 3/0484* (2013.01)
  *G06F 3/0488* (2013.01)

(52) U.S. Cl.
  CPC ........ *G06F 3/0488* (2013.01); *G06F 3/04845* (2013.01); *H04N 5/23216* (2013.01); *H04N 5/23245* (2013.01); *H04N 5/772* (2013.01); *H04M 2250/52* (2013.01)

(58) Field of Classification Search
  CPC .. G06F 3/04845; G06F 3/0488; G06F 3/0414; G06F 3/016
  See application file for complete search history.

(56) References Cited

U.S. PATENT DOCUMENTS

| | | |
|---|---|---|
| 2015/0256758 A1 | 9/2015 | Gao et al. |
| 2015/0281562 A1 | 10/2015 | Ruben et al. |

FOREIGN PATENT DOCUMENTS

| | | |
|---|---|---|
| CN | 103220464 A | 7/2013 |
| CN | 103533161 A | 1/2014 |
| CN | 103856710 A | 6/2014 |
| EP | 2897355 A1 | 7/2015 |

\* cited by examiner

SHOOTING METHOD AND MOBILE DEVICE

This application is a national stage of International Application No. PCT/CN2015/091814, filed on Oct. 13, 2015, which is hereby incorporated by reference in its entirety.

TECHNICAL FIELD

The present invention relates to the field of shooting and mobile device technologies, and in particular, to a shooting method and a mobile device.

BACKGROUND

Currently, there are mainly two types of visual media shot by using a mobile device such as a smartphone: a static picture and a video. With development of a Rich Capture (rich capture) technology of mobile devices, more new visual media forms have emerged, and most typical new visual media is, for example, a Living Image (living image). For the Living Image, a video clip is shot in real time before a static picture is captured. The video clip is combined with the static picture to form one Living Image.

In most cases, a respective shooting mode needs to be set for shooting different forms of video media such as a picture and a video. A currently commonly used mobile device in a picture shooting mode may shoot a picture after a shooting button is pressed, but cannot shoot a video. If a video needs to be shot, the mobile device needs to enter a video shooting mode, and then a video, especially a shorter video, can be shot after the shooting button is pressed. A full name of the shorter video is Shorter Video in English. In most cases, a video shot by a user by using a mobile device is a shorter video.

In addition to the picture shooting mode and the video shooting mode, a new shooting mode needs to be added to a mobile device supporting the Living Image. In other words, in the prior art, new visual media such as the Living Image can be shot only after a video shooting mode is switched on a shooting screen of the mobile device. However, an operation of switching between multiple shooting modes is relatively tedious, and for a user, interaction is inconvenient.

SUMMARY

A shooting method and a mobile device disclosed in embodiments of the present invention are used to resolve a technical problem in shooting new visual media such as a Living Image by operating a shooting button, so as to simplify shooting operations of the new visual media, such as the Living Image, that is different from a picture and a video.

A first aspect of the present invention provides a shooting method, including: starting video shooting on a shooting screen when a long press event of a shooting button is received; and when the long press event ends, if a long press period of the shooting button does not exceed a first set threshold, completing mixed visual media shooting, where the mixed visual media includes one video clip and at least one static picture.

A difference from the prior art is that, the mixed visual media that is different from a picture and a video is shot when the long press period does not reach the first set threshold. In this way, a user does not need to perform a complicated operation such as shooting mode switching, and can implement shooting of the mixed visual media only by operating the shooting button. This simplifies user operation steps and facilitates the ease of user operations.

With reference to the first aspect, in a first possible implementation manner, after the starting video shooting, the method further includes: when the long press period of the shooting button reaches a second set threshold, performing an alert operation, where the second set threshold is less than the first set threshold.

With reference to the first possible implementation manner of the first aspect, in a second possible implementation manner, after the performing an alert operation, the method further includes: when the long press period of the shooting button reaches the first set threshold, or when it is detected that the long press event ends before the long press period of the shooting button reaches the first set threshold, stopping the alert operation.

With reference to the second possible implementation manner of the first aspect, in a third possible implementation manner, the performing an alert operation includes: starting vibration; and the stopping the alert operation includes: stopping vibration.

With reference to the first aspect or any one of the first to the third possible implementation manners of the first aspect, in a fourth possible implementation manner, the when the long press event ends, if a long press period of the shooting button does not exceed a first set threshold, completing mixed visual media shooting includes: when the long press event ends, if the long press period of the shooting button does not exceed the first set threshold, stopping video shooting to obtain a video clip, and after stopping video shooting, shooting one static picture or shooting multiple static pictures continuously, where the video clip and the one or multiple static pictures are combined into the mixed visual media.

With reference to the first aspect or any one of the first to the third possible implementation manners of the first aspect, in a fifth possible implementation manner, the method further includes: when the long press event ends, if the long press period of the shooting button exceeds the first set threshold, completing video shooting.

With reference to the first aspect or any one of the first to the third possible implementation manners of the first aspect, in a sixth possible implementation manner, the method further includes: shooting a static picture on a shooting screen when a tap event of a shooting button is received.

A second aspect of the present invention provides a mobile device, including:

a shooting starting module, configured to start video shooting on a shooting screen when a long press event of a shooting button is received; and a shooting ending module, configured to, when the long press event ends, if a long press period of the shooting button does not exceed a first set threshold, complete mixed visual media shooting, where the mixed visual media includes one video clip and at least one static picture.

A difference from the prior art is that, the mixed visual media that is different from a picture and a video is shot when the long press period does not reach the first set threshold. In this way, a user does not need to perform a complicated operation such as shooting mode switching, and can implement shooting of the mixed visual media only by operating the shooting button. This simplifies user operation steps and facilitates the ease of user operations.

With reference to the second aspect, in a first possible implementation manner, the mobile device further includes:

an alert module, configured to perform an alert operation when the long press period of the shooting button reaches a second set threshold, where the second set threshold is less than the first set threshold.

With reference to the first possible implementation manner of the second aspect, in a second possible implementation manner, the alert module is further configured to stop the alert operation when the long press period of the shooting button reaches the first set threshold or when it is detected that the long press event ends before the long press period of the shooting button reaches the first set threshold.

With reference to the second possible implementation manner of the second aspect, in a third possible implementation manner, the alert module is specifically configured to: start vibration when performing the alert operation; and stop vibration when stopping the alert operation.

With reference to the second aspect or any one of the first to the third possible implementation manners of the second aspect, in a fourth possible implementation manner, the shooting ending module is specifically configured to: when the long press event ends, if the long press period of the shooting button does not exceed the first set threshold, stop video shooting to obtain a video clip; and after stopping video shooting, shoot one static picture or shoot multiple static pictures continuously, where the video clip and the one or multiple static pictures are combined into the mixed visual media.

With reference to the second aspect or any one of the first to the fourth possible implementation manners of the second aspect, in a fifth possible implementation manner, after the starting video shooting, the method further includes: when the long press event ends, if the long press period of the shooting button exceeds the first set threshold, completing video shooting.

With reference to the second aspect or any one of the first to the fourth possible implementation manners of the second aspect, in a sixth possible implementation manner, the method further includes a third shooting module, configured to shoot a static picture on a shooting screen when a tap event of a shooting button is received.

A third aspect of the present invention provides another mobile device, including: a touchscreen, a camera module, one or more processors, a memory, and one or more programs, where the one or more programs are stored in the memory and configured to be executed by the one or more processors, and the one or more programs include an instruction used to perform the following operations: start video shooting on a shooting screen when a long press event of a shooting button is received; and when the long press event ends, if a long press period of the shooting button does not exceed a first set threshold, complete mixed visual media shooting, where the mixed visual media includes one video clip and at least one static picture.

A fourth aspect of the present invention provides a computer readable storage medium storing one or more programs, where the one or more programs include an instruction, and when being executed by a mobile device including a touchscreen and multiple application programs, the instruction enables the mobile device to perform the following instruction: start video shooting on a shooting screen when a long press event of a shooting button is received; and when the long press event ends, if a long press period of the shooting button does not exceed a first set threshold, complete mixed visual media shooting, where the mixed visual media includes one video clip and at least one static picture.

It can be learned that, in some feasible implementation manners of the present invention, the following technical solution is used: starting video shooting on a shooting screen when a long press event of a shooting button is received; and when the long press event ends, if a long press period of the shooting button does not exceed a first set threshold, completing mixed visual media shooting. The following technical effects are achieved: Different shooting modes are distinguished according to different long press periods of the shooting button; and in addition to tap shooting for a picture and long-press shooting for a video, a third shooting mode is added, that is, when the long press period does not reach the first set threshold, shooting mixed visual media that is different from a picture and a video. In this way, a user does not need to perform a complicated operation such as shooting mode switching, and can implement shooting of multiple media forms such as the mixed visual media and a video only by operating the shooting button. This simplifies user operation steps and facilitates the ease of user operations.

BRIEF DESCRIPTION OF THE DRAWINGS

To describe the technical solutions in the embodiments of the present invention more clearly, the following briefly describes the accompanying drawings required for describing the embodiments and the prior art. Apparently, the accompanying drawings in the following description show merely some embodiments of the present invention, and a person of ordinary skill in the art may still derive other drawings from these accompanying drawings without creative efforts.

DETAILED DESCRIPTION

Figure 1:
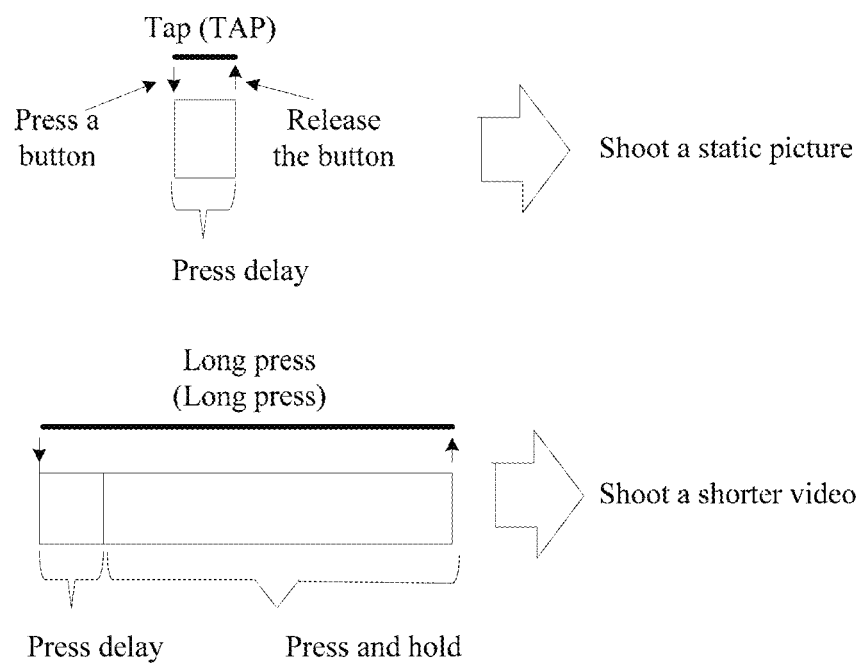
FIG. 1 is a schematic diagram of a tap and a long press.

The embodiments of the present invention provide a shooting method and a mobile device to resolve a technical problem of shooting new visual media such as a Living Image by operating a shooting button, so as to simplify a shooting operation of the new visual media, such as the Living Image, that is different from a picture and a video.

To make a person skilled in the art understand the technical solutions in the present invention better, the following clearly and completely describes the technical solutions in the embodiments of the present invention with reference to the accompanying drawings in the embodiments of the present invention. Apparently, the described embodiments are merely a part rather than all of the embodiments of the present invention. All other embodiments obtained by a person of ordinary skill in the art based on the embodiments of the present invention without creative efforts shall fall within the protection scope of the present invention.

In the specification, claims, and accompanying drawings of the present invention, the terms "first", "second", "third", and so on are intended to distinguish between different objects but do not indicate a particular order. In addition, the terms "including", "including", or any other variant thereof, are intended to cover a non-exclusive inclusion. For example, a process, a method, a system, a product, or a device that includes a series of steps or units is not limited to the listed steps or units, but optionally further includes an unlisted step or unit, or optionally further includes another inherent step or unit of the process, the method, the product, or the device.

The technical solutions of the present invention are applied to any mobile device having a picture or video shooting function, for example, various mobile phones of different standards, various smart phones based on different operating systems, a personal digital assistant (Personal Digital Assistant, PDA for short), a portable Android device (portable Android device, pad for short), an iPad, a wearable product, and a personal computer. No specific limitation is made herein.

A mobile device described in an embodiment of the present invention has a camera module and a shooting button. The shooting button includes but is not limited to a physical button on the mobile device and a virtual button presented on a touchscreen of the mobile device. The mobile device in this embodiment of the present invention may shoot a static picture, a video, or new visual media. In this embodiment of the present invention, a format of the static picture includes but is not limited to, for example, JPEG (full name in English: Joint Photographic Experts GROUP, JPEG or JPG for short). A format of the video includes but is not limited to, for example, RMVB, and MOV (a Quicktime movie format). In this embodiment of the present invention, the video usually refers to a shorter video (full name in English: Shorter Video) with a relatively short length, such as a length within tens of minutes, but is not limited to the shorter video. In this embodiment of the present invention, the new visual media includes but is not limited to a Living Image.

Currently, some mobile devices support a long press (Long Press) operation on a shooting button. That is, in a picture shooting mode, a tap (Tap) is used to shoot an individual picture, and a long press (Long Press) is used to shoot multiple pictures. FIG. 1 shows a schematic diagram of a tap operation and a long press operation.

Referring to FIG. 1, a schematic diagram of a tap is shown in the upper part. As shown in FIG. 1, after pressing a button, a user then immediately releases the button, and a holding period after the button is pressed is less than a preset press delay. In this case, the mobile device considers that a tap event occurs on the button, and shoots a single picture.

Referring to FIG. 1, a schematic diagram of a long press is shown in the lower part. As shown in FIG. 1, a user presses and holds the button until a holding period is greater than the preset press delay. In this case, the mobile device considers that a long press event occurs on the button, and shoots multiple pictures continuously.

Figure 2:
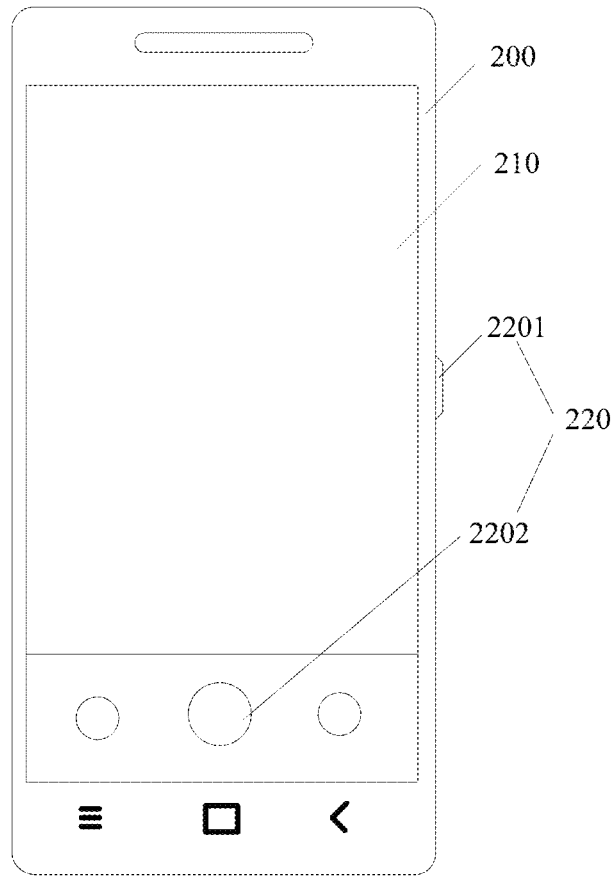
FIG. 2 is a schematic structural diagram of a mobile device.

For example, FIG. 2 shows a schematic structural diagram of a mobile device according to an embodiment of the present invention. The mobile device 200 includes: a touchscreen 210, a shooting button 220, and a camera module (not shown in the figure). The shooting button 220 may include at least one of a shooting button 2201 in a form of a physical button and a shooting button 2202 in a form of a virtual button presented on the touchscreen 210. In this embodiment of the present invention, the shooting button 220 of the mobile device 200 supports a tap operation and a long press operation. When the shooting button 220 of the mobile device does not support the long press operation, programming processing may be performed at an application layer of the mobile device to enable the mobile device to support the long press operation. For a specific programming method, refer to the prior art. When a user taps the shooting button 220, the mobile device 200 may receive a tap event of the shooting button 220. When the user long presses the shooting button 220, the mobile device 200 may receive a long press event of the shooting button 220.

The following provides detailed descriptions separately by using specific embodiments.

Embodiment 1 of the present invention provides a shooting method applied to a mobile device. The shooting method mainly includes: starting video shooting on a shooting screen when a long press event of a shooting button is received; and when the long press event ends, if a long press period of the shooting button does not exceed a first set threshold, completing mixed visual media shooting, where the mixed visual media includes one video clip and at least one static picture.

Figure 3:
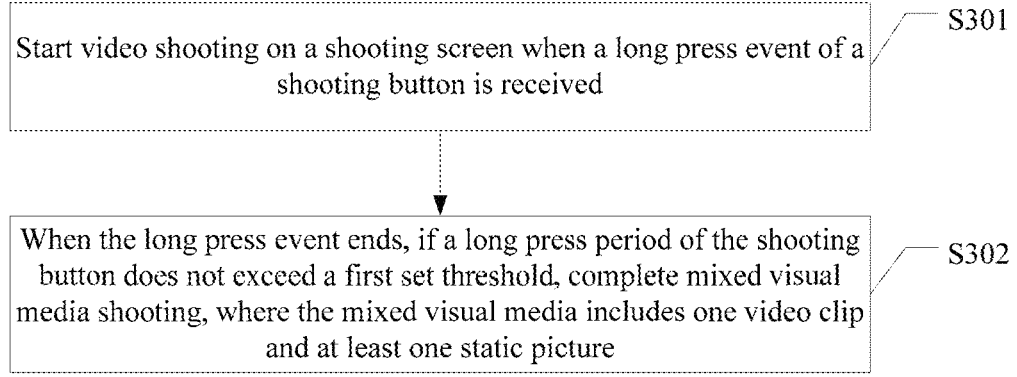
FIG. 3 is a schematic diagram of a shooting method according to an embodiment of the present invention.

Referring to FIG. 3, a specific process of a shooting method according to an embodiment of the present invention is as follows.

S301: Start video shooting on a shooting screen when a long press event of a shooting button is received.

In this embodiment of the present invention, a mobile device 200 supports the following functions: when a tap event is received, automatically entering a picture shooting mode is to shoot a picture; and when a long press event is received, automatically entering a video shooting mode to shoot a video. In other words, in this embodiment of the present invention, a user does not need to switch a shooting mode, and a static picture or a video can be shot only by operating the shooting button.

In a process a user starts a camera module of the mobile device to perform shooting, the user may tap the shooting button of the mobile device to shoot a static picture, and in this case, the mobile device receives a tap event of the shooting button. The user may also long press the shooting button of the mobile device to shoot a video, and in this case, the mobile device receives a long press event of the shooting button.

Figure 4A:
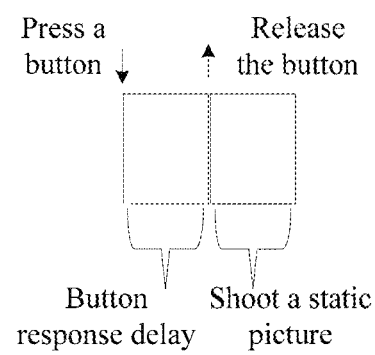
FIG. 4a is a schematic diagram of a tap for shooting a static picture.

Referring to FIG. 4a, FIG. 4a is a schematic diagram of a tap for shooting a static picture. The tap means that after pressing the shooting button, a user releases the shooting button before a button response delay of the shooting button is reached, to make the shooting button rise up. After the shooting button is pressed, if detecting that the shooting button rises up before the button response delay is reached, the mobile device determines that a tap event of the shooting button is received.

Figure 4B:
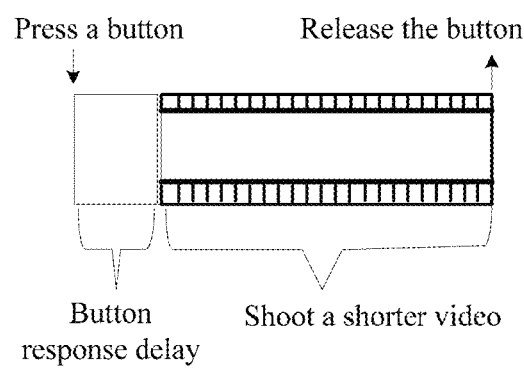
FIG. 4b is a schematic diagram of a long press for shooting a video.

Referring to FIG. 4b, FIG. 4b is a schematic diagram of a long press for shooting a video. The long press means that a user presses and holds the shooting button, and releases the shooting button after a button response delay of the shooting button is reached, to make the shooting button rise up after the button response delay is reached. After the shooting button is pressed, if detecting that the shooting button rises up after the button response delay is reached, the mobile device determines that a long press event of the shooting button is received.

For example, a method for determining a tap event or a long press event may be: The mobile device starts a first timer with a preset period when detecting that the shooting button is pressed, where the preset period of the first timer is equal to the button response delay of the shooting button; starts a thread when the preset period of the first timer expires to determine whether the shooting button is pressed; and if the shooting button is pressed, determines that a long press event occurs on the shooting button, and if the shooting button rises up, determines that a tap event occurs on the shooting button.

In this embodiment of the present invention, to achieve the purpose of the present invention, when the long press event of the shooting button is received, whether a long press period of the shooting button exceeds a first set threshold is further determined. Long press events are classified into two types according to determination results. Different shooting modes are entered according to a type of the long press event to perform different operations. The first set threshold is greater than the button response delay. The long press period is a time period corresponding to the long press event.

For example, a method for determining that the long press period exceeds the first set threshold may include: The mobile device starts a second timer with a preset period when detecting that the shooting button is pressed, where the preset period of the second timer is equal to the first set threshold; starts a thread when the preset period of the second timer expires to determine whether the shooting button is pressed; and if the shooting button is pressed, determines that the long press period of the shooting button exceeds the first set threshold. For example, a method for determining whether the long press period does not exceed the first set threshold may include: when it is detected that the long press event ends before the long press period of the shooting button reaches the first set threshold, it is determined that the long press period of the shooting button does not exceed the first set threshold.

S302: When the long press event ends, if a long press period of the shooting button does not exceed a first set threshold, complete mixed visual media shooting, where the mixed visual media includes one video clip and at least one static picture.

In this embodiment of the present invention, when detecting that the long press event ends on a shooting screen, if determining that the long press period of the shooting button does not exceed the first set threshold, the mobile device completes shooting of the mixed visual media that is different from a static picture and a video. The mixed visual media described herein refers to a combination of a static picture and a video, and the mixed visual media includes but is not limited to one video clip and one static picture. For example, two or more static pictures may be included in the mixed visual media; and shooting parameters of different static pictures may be the same or may be different.

Figure 4C:
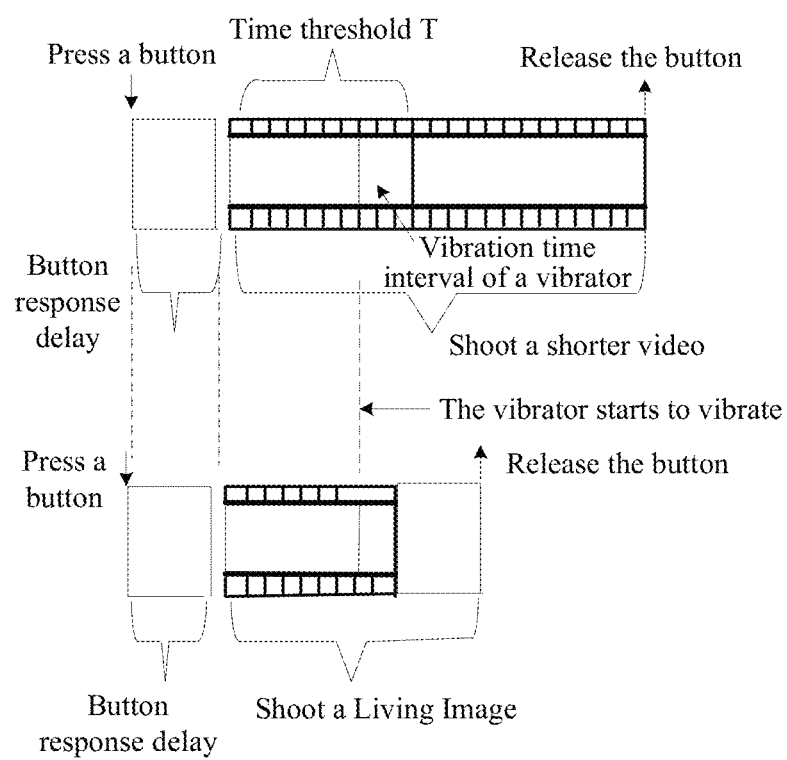
FIG. 4c is a schematic diagram of a long press for shooting mixed visual media or a video.

As shown in FIG. 4c, in a specific implementation manner, the mobile device may start video shooting when determining that the long press event occurs on the shooting button, that is, the button response delay is reached after the shooting button is pressed. When detecting that the long press event ends, that is, detecting that the shooting button rises up or a rising-up event of the shooting button is received, if the long press period of the shooting button does not reach the first set threshold, the mobile device stops video shooting to obtain a video clip, and after stopping video shooting, immediately shoots one static picture or shoots multiple static pictures continuously. It can be learned that, in this mode, after a video clip is shot, one or multiple static pictures are further shot. The video clip and one or multiple static pictures that are shot are combined into a required mixed visual media.

It should be noted that the video clip described herein refers to a video with a relatively short length. The length of the video is not greater than the first set threshold. The video clip may be a video in a common video format such as RMVB or MOV, or may be an analog video clip consisting of multiple low resolution static pictures shot continuously. Low resolution means that resolution of static pictures for composing a video clip is lower than resolution of one static picture shot after the video is shot. Further, the technical solution in this embodiment of the present invention may also support a tap for shooting a static picture and a long press for shooting a video.

Optionally, the method in this embodiment of the present invention may further include:

when the long press event ends, if the long press period of the shooting button exceeds the first set threshold, completing video shooting.

This step may be performed after step S301. As shown in FIG. 4c, in a specific implementation manner, the mobile device may start video shooting when determining that the long press event occurs on the shooting button. A start time point of the video may be a time when a button response delay is reached after the shooting button is pressed. After the long press period reaches the first set threshold, if detecting that the long press event ends, the mobile device stops video shooting. A required video is shot in this mode, and a length of the video is greater than the first set threshold.

Optionally, the method in this embodiment of the present invention may further include:

shooting a static picture on the shooting screen when a tap event of the shooting button is received.

This step may be performed after or before step S301. Implementation details of this step are not described herein, and for specific implementation, refer to the prior art.

It can be learned from the above that Embodiment 1 of the present invention provides a shooting method. A difference from the prior art is that, in this embodiment of the present invention, different shooting modes are distinguished according to different long press periods of a shooting button, and whether mixed video media shooting is completed is determined by determining whether a long press period exceeds a first set threshold when a long press event of the shooting button is received. Compared with that in the prior art, a shooting module is added so that the shooting button supports three shooting modes, including:

shooting a static picture when a tap event is received;

when a long press event is received, starting video shooting, and when the long press event ends, if a long press period exceeds a first set threshold, completing video shooting; and when a long press event is received, starting video shooting, and when the long press event ends, if a long press period does not exceed a first set threshold, completing shooting of mixed visual media such as a Living image.

It can be learned that, in the technical solution of this embodiment of the present invention, different shooting modes are distinguished according to different long press periods of a shooting button. In addition to tap shooting for a picture and long-press shooting for a video, a third shooting mode is added, that is, when a long press period does not reach a first set threshold, shooting mixed visual media that is different from a picture and a video. In this way, a user does not need to perform a complicated operation, such as shooting mode switching, on an operation screen of a mobile device, and can implement shooting of multiple media forms, such as mixed visual media, a picture, and a video, only by operating the shooting button. In other words, this simplifies user operation steps and facilitates the ease of user operations.

Embodiment 2 of the present invention provides another shooting method.

Figure 5:
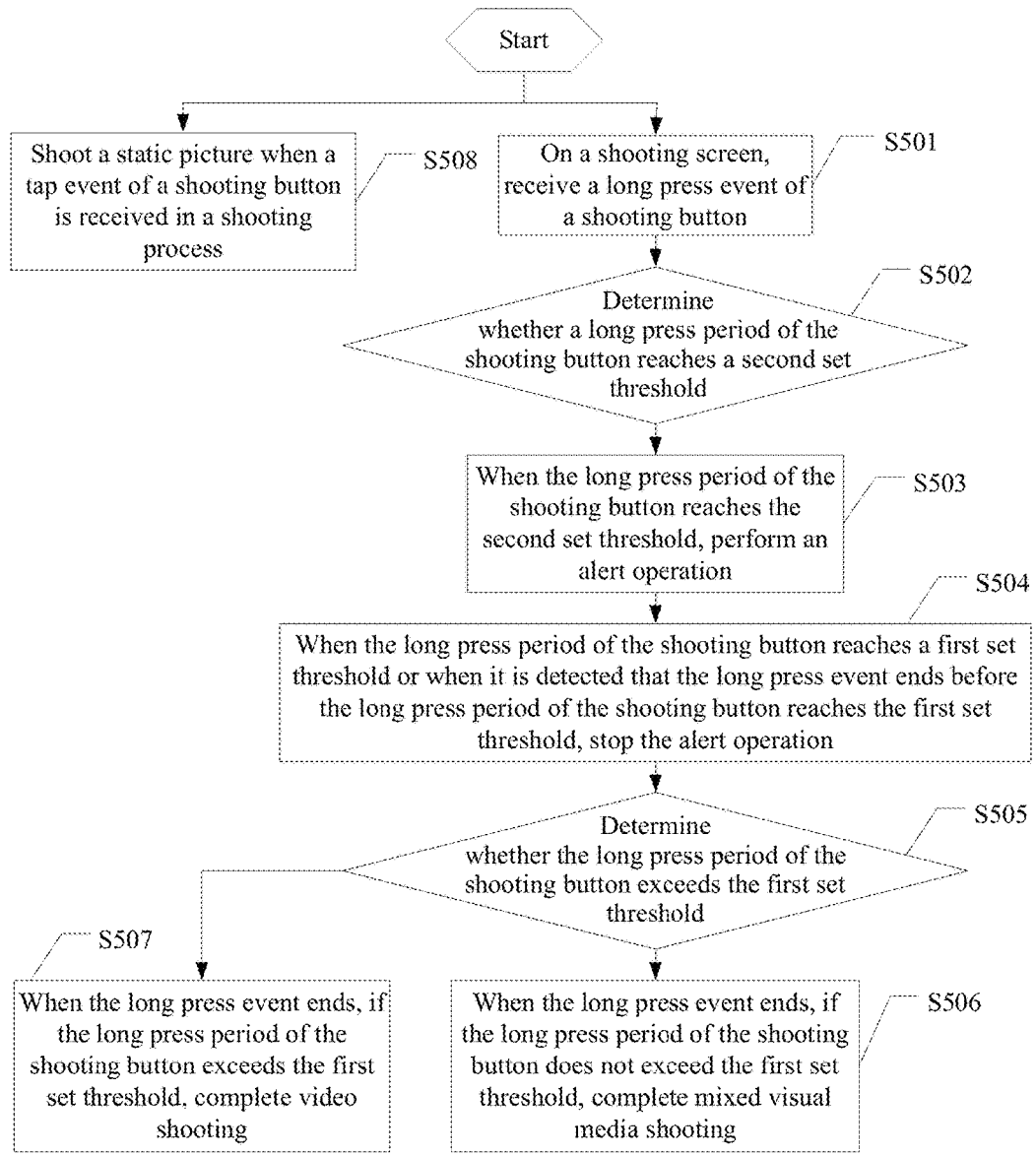
FIG. 5 is a schematic diagram of another shooting method according to an embodiment of the present invention.

Referring to FIG. 5, a specific process of a shooting method according to an embodiment of the present invention is as follows.

S501: On a shooting screen, receive a long press event of a shooting button.

For specific implementation of this step, refer to step S301 in Embodiment 1, and details are not described herein again.

S502: Determine whether a long press period of the shooting button reaches a second set threshold.

The second set threshold is less than the first set threshold, and the second set threshold is further greater than a button response delay of the shooting button.

S503: When the long press period of the shooting button reaches the second set threshold, perform an alert operation.

The performing an alert operation may include: starting vibration. Generally, a mobile device, such as a smartphone, includes a built-in vibrator. The performing an alert operation may include: starting the built-in vibrator to vibrate the mobile device. When a user senses vibration of the mobile device, if the user releases the button to make the shooting button rise up, the long press period of the shooting button does not exceed the first set threshold. As shown in FIG. 4c, when the long press event occurs on the shooting button, the mobile device starts to vibrate when the long press period of the shooting button reaches the second set threshold.

S504: When the long press period of the shooting button reaches a first set threshold or when it is detected that the long press event ends before the long press period of the shooting button reaches the first set threshold, stop the alert operation.

The stopping the alert operation may include: stopping vibration, that is, stopping the built-in vibrator to make the mobile device stop vibration. Optionally, if the user releases the shooting button when sensing that the mobile device vibrates to end the long press event, the mobile device may stop the alert operation when detecting that the long press event ends. If the user does not release the shooting button when sensing that the mobile device vibrates, and the mobile device does not detect that the shooting button rises up before the first set threshold is reached, the mobile device can continue performing the alert operation until the first set threshold is reached. In other words, the mobile device may continue vibration during a time period from a time when the second set threshold is reached to a time when the first set threshold is reached, unless it is detected that the long press event ends. The length of the time period for the continuous vibration may be set to a value much less than the first set threshold. For example, the first set threshold may be set to 10 seconds, the second set threshold may be set to 8.5 seconds, and the time period of the continuous vibration is 1.5 seconds.

As shown in FIG. 4c, when the long press event occurs on the shooting button, the mobile device starts to vibrate when the long press period of the shooting button reaches the second set threshold. If the user does not release the shooting button before the first set threshold is reached, the mobile device continues vibration and does not stop vibration until the first set threshold is reached.

S505: Determine whether the long press period of the shooting button exceeds the first set threshold.

For specific implementation of this step, refer to step S301 in Embodiment 1, and details are not described herein again.

S506: When the long press event ends, if the long press period of the shooting button does not exceed the first set threshold, complete mixed visual media shooting, where the mixed visual media includes one video clip and one static picture.

Specific implementation of this step is the same as step S302 in Embodiment 1, and details are not described herein again.

It should be noted that, a vibration manner is used in this embodiment to alert the user. If the user releases the shooting button within a vibration period, the long press period of the shooting button cannot exceed the first set threshold, and in this case, mixed visual media shooting is completed.

S507: When the long press event ends, if the long press period of the shooting button exceeds the first set threshold, complete video shooting.

For specific implementation of this step, refer to descriptions in Embodiment 1, and details are not described herein again.

However, it should be noted that, a vibration manner is used in this embodiment to alert the user. If the user releases the shooting button after the vibration period is reached, the long press period of the shooting button certainly exceeds the first set threshold, and in this case, media shooting is completed.

S508: Shoot a static picture on the shooting screen when a tap event of the shooting button is received.

For specific implementation of this step, refer to descriptions in Embodiment 1, and details are not described herein again.

It can be learned that, Embodiment 2 of the present invention provides another shooting method on a basis of Embodiment 1. A difference from the technical solution of Embodiment 1 is that when a long press period is close to a first set threshold, a mobile device performs an alert operation, for example, a built-in oscillator of the mobile device starts to vibrate to alert a user. In this case, if the user releases a shooting button, shooting ends and mixed video media such as a Living image is shot. On the contrary, if the user presses and holds the shooting button regardless of vibration of the oscillator until the user releases the shooting button after vibration stops, visual media that is shot is a video. It can be learned that, a vibration manner is used to alert the user to shoot mixed visual media or a video, so as to further facilitate the ease of user operations.

To better implement the foregoing solutions of the embodiments of the present invention, the following further provides a related apparatus for implementing the foregoing solutions.

Figure 6:
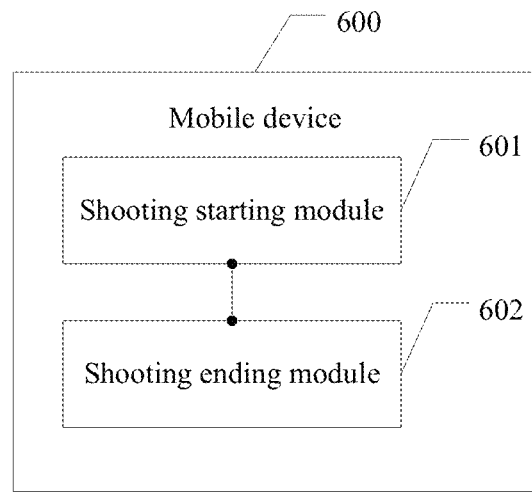
FIG. 6 is a schematic diagram of a mobile device according to an embodiment of the present invention.

Referring to FIG. 6, Embodiment 3 of the present invention provides a mobile device 600. The mobile device 600 may include: a shooting starting module 601 and a shooting ending module 602.

The shooting starting module 601 is configured to start video shooting on a shooting screen when a long press event of a shooting button is received.

The shooting ending module 602 is configured to, when the long press event ends, if a determining module determines that a long press period of the shooting button does not exceed a first set threshold, complete mixed visual media shooting. The mixed visual media includes one video clip and at least one static picture.

Figure 7:
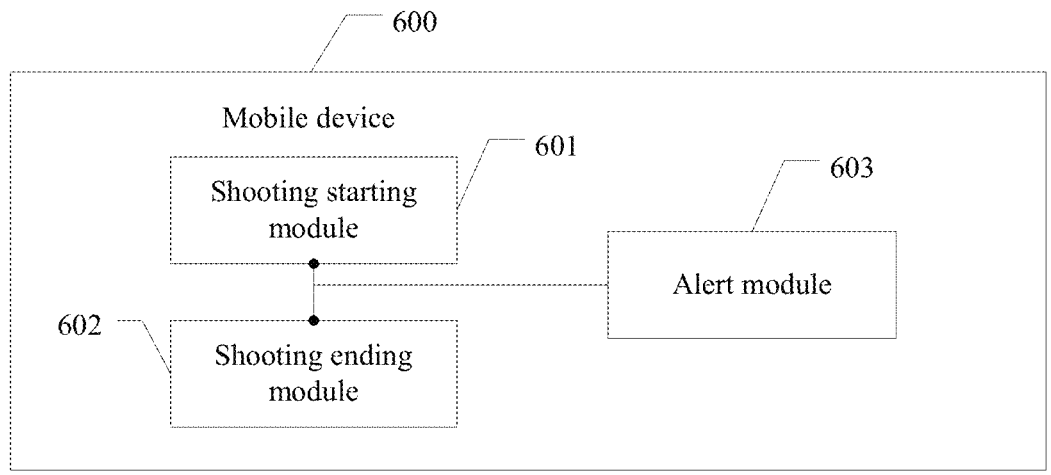
FIG. 7 is a schematic diagram of another mobile device according to an embodiment of the present invention.

Referring to FIG. 7, in some embodiments of the present invention, the mobile device 600 may further include:

an alert module 603, configured to perform an alert operation when the long press period of the shooting button reaches a second set threshold, where the second set threshold is less than the first set threshold.

Further, the alert module 603 is further configured to stop the alert operation when the long press period of the shooting button reaches the first set threshold or when it is detected that the long press event ends before the long press period of the shooting button reaches the first set threshold.

Further, the alert module 603 may be specifically configured to: start vibration when the alert operation is performed; and stop vibration when the alert operation is stopped.

Further, the shooting ending module 602 may be specifically configured to: when the long press event ends, if the long press period of the shooting button does not exceed the first set threshold, stop video shooting to obtain a video clip; and after stopping video shooting, shoot one static picture or shoot multiple static pictures continuously. The video clip and the one or multiple static pictures are combined into the mixed visual media.

In some embodiments of the present invention, the shooting ending module 602 is further configured to: when the long press event ends, if the long press period of the shooting button exceeds the first set threshold, complete video shooting.

In some embodiments of the present invention, the shooting ending module 602 is further configured to shoot a static picture on the shooting screen when a tap event of the shooting button is received.

The mobile device of this embodiment of the present invention may be a smartphone, a tablet computer, an iPad, or the like.

It should be understood that, functions of functional modules of the mobile device in this embodiment of the present invention may be specifically implemented according to the methods in the foregoing method embodiments. For a specific implementation process, refer to related descriptions in the foregoing method embodiments, and details are not described herein again.

In addition, a structure of the mobile device includes but is not limited to a product structure shown in FIG. 2.

It can be learned that, in some feasible implementation manners of the present invention, a mobile device is provided. Different shooting modes are distinguished according to different long press periods of a shooting button. In addition to tap shooting for a picture and long-press shooting for a video, a third shooting mode is added, that is, when a long press period does not reach a first set threshold, shooting mixed visual media that is different from a picture and a video. In this way, a user does not need to perform a complicated operation, such as shooting mode switching, on an operation screen of a mobile device, and can implement shooting of multiple media forms, such as mixed visual media, a picture, and a video, only by operating the shooting button. In other words, this simplifies user operation steps and facilitates the ease of user operations.

Figure 8:
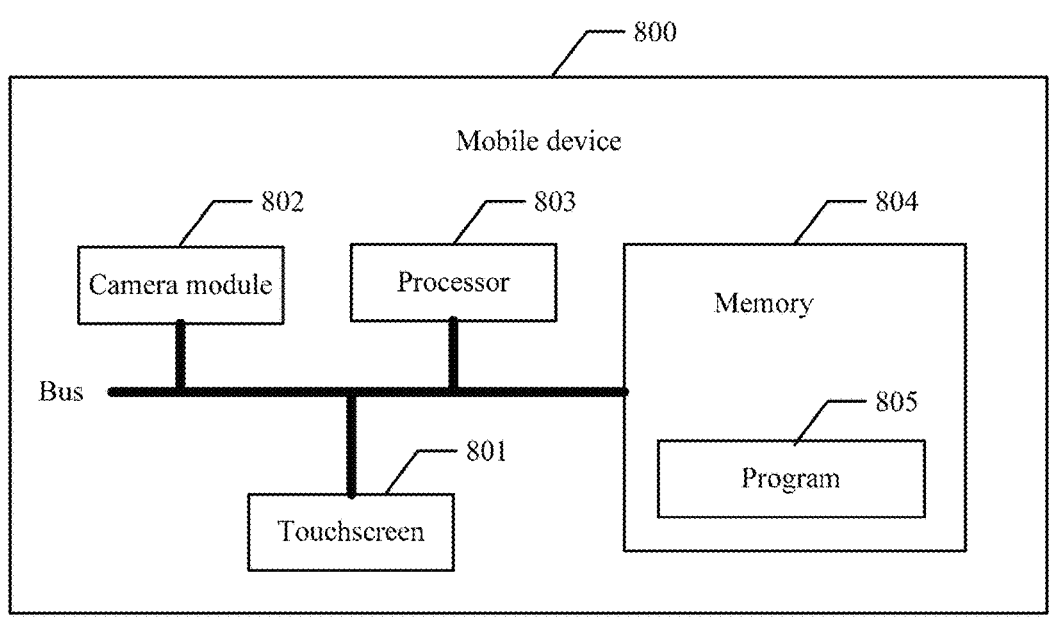
FIG. 8 is a schematic diagram of still another mobile device according to an embodiment of the present invention.

Referring to FIG. 8, Embodiment 4 of the present invention further provides another mobile device 800.

It should be noted that Embodiment 3 shown in FIG. 6 and FIG. 7 illustrates a specific structure of the mobile device from a view of a functional module, and the following describes the specific structure of the mobile device with reference to Embodiment 4 shown in FIG. 8 from a view of hardware.

As shown in FIG. 8, the mobile device 800 may include: a touchscreen 801, a camera module 802, one or more processors 803, a memory 804, and one or more programs 805. The one or more programs 805 are stored in the memory 804 and configured to be executed by the one or more processors 803, and the one or more programs 805 include an instruction used to perform the shooting methods described in the foregoing method embodiments.

Specifically, by calling one or more programs 805 stored in the memory 804, the processor 803 is configured to perform the following steps: starting video shooting on a shooting screen when a long press event of a shooting button is received; and when the long press event ends, if a long press period of the shooting button does not exceed a first set threshold, completing mixed visual media shooting, where the mixed visual media includes one video clip and at least one static picture.

After starting video shooting, the processor 803 is further configured to perform the following step: performing an alert operation when the long press period of the shooting button reaches a second set threshold. The second set threshold is less than the first set threshold.

After performing the alert operation, the processor 803 is further configured to perform the following step: stopping the alert operation when the long press period of the shooting button reaches the first set threshold or when detecting that the long press event ends before the long press period of the shooting button reaches the first set threshold.

Further, the performing an alert operation includes starting vibration; and the stopping the alert operation includes stopping vibration.

The step of completing mixed visual media shooting may specifically include: when the long press event ends, if the long press period of the shooting button does not exceed the first set threshold, stopping video shooting to obtain a video clip; and after stopping video shooting, shooting one static picture or shooting multiple static pictures continuously, where the video clip and the one or multiple static pictures are combined into the mixed visual media.

After the starting video shooting, the processor 803 is further configured to perform the following step: when the long press event ends, if the long press period of the shooting button exceeds the first set threshold, completing video shooting.

Further, the processor 803 is further configured to perform the following step: shooting a static picture on the shooting screen when a tap event of the shooting button is received.

It can be learned that, in some feasible implementation manners of the present invention, a mobile device is provided. Different shooting modes are distinguished according to different long press periods of a shooting button. In addition to tap shooting for a picture and long-press shooting for a video, a third shooting mode is added, that is, when a long press period does not reach a first set threshold, shooting mixed visual media that is different from a picture and a video. In this way, a user does not need to perform a complicated operation, such as shooting mode switching, on an operation screen of a mobile device, and can implement shooting of multiple media forms, such as mixed visual media, a picture, and a video, only by operating the shooting button. In other words, this simplifies user operation steps and facilitates the ease of user operations.

In addition, Embodiment 5 of the present invention further provides a computer storage medium. The computer storage medium may store a program, and, when the program is executed, a part or all of the steps of the shooting method in the foregoing method embodiments may be performed.

In the foregoing embodiments, the description of each embodiment has respective focuses. For a part that is not described in detail in an embodiment, refer to related descriptions in other embodiments.

It should be noted that, for ease of description, the foregoing method embodiments are described as a series of action combinations. However, a person skilled in the art should understand that the present invention is not limited to the described sequence of the actions, because some steps may be performed in another sequence or performed at the same time according to the present invention. In addition, a person skilled in the art should also appreciate that all the embodiments described in the specification are example embodiments, and the related actions and modules are not necessarily mandatory to the present invention.

It may be clearly understood by a person skilled in the art that, for the purpose of convenient and brief description, for a detailed working process of the foregoing system, apparatus, and unit, refer to a corresponding process in the foregoing method embodiments, and details are not described herein again.

In the several embodiments provided in this application, it should be understood that the disclosed system, apparatus, and method may be implemented in other manners. For example, the described apparatus embodiment is merely an example. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected according to actual needs to achieve the objectives of the solutions of the embodiments.

In addition, functional units in the embodiments of the present invention may be integrated into one processing unit, or each of the units may exist alone physically, or two or more units are integrated into one unit. The integrated unit may be implemented in a form of hardware, or may be implemented in a form of a software functional unit.

When the integrated unit is implemented in the form of a software functional unit and sold or used as an independent product, the integrated unit may be stored in a computer-readable storage medium. Based on such an understanding, the technical solutions of the present invention essentially, or the part contributing to the prior art, or all or some of the technical solutions may be implemented in the form of a software product. The software product is stored in a storage medium and includes several instructions for instructing a computer device (which may be a personal computer, a server, or a network device) to perform all or some of the steps of the methods described in the embodiments of the present invention. The foregoing storage medium includes: any medium that can store program code, such as a USB flash drive, a removable hard disk, a read-only memory (ROM, Read-Only Memory), a random access memory (RAM, Random Access Memory), a magnetic disk, or an optical disc.

The shooting method and the mobile device provided in the embodiments of the present invention are described in detail above. The principle and implementation manners of the present invention are described herein through specific examples. The description about the embodiments of the present invention is merely provided to help understand the method and core ideas of the present invention. In addition, persons of ordinary skill in the art can make variations and modifications to the present invention in terms of the specific implementations and application scopes according to the ideas of the present invention. Therefore, the content of specification shall not be construed as a limit to the present invention.

What is claimed is:

1. A shooting method, comprising:
    starting video shooting on a shooting screen when a long press event of a shooting button is received; and
    when the long press event ends, and when a long press period of the shooting button does not exceed a first set threshold, completing shooting mixed visual media, wherein the mixed visual media comprises one video clip and at least one static picture, wherein after starting video shooting, the method further comprises:
    when the long press period of the shooting button reaches a second set threshold, performing an alert operation, wherein the second set threshold is less than the first set threshold.

2. The method according to claim 1, wherein after performing an alert operation, the method further comprises:
    when the long press period of the shooting button reaches the first set threshold or ends before reaching the first set threshold, stopping the alert operation.

3. The method according to claim 2, wherein:
    performing an alert operation comprises: starting vibration; and
    stopping the alert operation comprises: stopping vibration.

4. The method according to claim 1, wherein completing shooting mixed visual media comprises:
    stopping video shooting to obtain a video clip, and after stopping video shooting, shooting one static picture or shooting multiple static pictures continuously, wherein the video clip and the one or multiple static pictures are combined into the mixed visual media.

5. The method according to claim 1, wherein after starting video shooting, the method further comprises:
    when the long press event ends, if the long press period of the shooting button exceeds the first set threshold, completing video shooting.

6. A mobile device, comprising:
    at least one processor; and
    a memory coupled to the at least one processor and storing programming instructions for execution by the at least one processor, the programming instructions instruct the at least one processor to perform operations comprising:
    starting video shooting on a shooting screen when a long press event of a shooting button is received; and
    when the long press event ends, and when a long press period of the shooting button does not exceed a first set threshold, completing shooting mixed visual media, wherein the mixed visual media comprises one video clip and at least one static picture, wherein the operations further comprise performing an alert operation when the long press period of the shooting button reaches a second set threshold, wherein the second set threshold is less than the first set threshold.

7. The mobile device according to claim 6, wherein the operations comprise: stopping the alert operation when the long press period of the shooting button reaches the first set threshold or ends before reaching the first set threshold.

8. The mobile device according to claim 7, wherein the operations comprise:
   starting vibration when performing the alert operation; and
   stopping vibration when stopping the alert operation.

9. The mobile device according to claim 6, wherein completing shooting mixed visual media comprises:
   stopping video shooting to obtain a video clip; and after stopping video shooting, shooting one static picture or shoot multiple static pictures continuously, wherein the video clip and the one or multiple static pictures are combined into the mixed visual media.

10. The mobile device according to claim 6, wherein the operations comprise:
   when the long press event ends, if the long press period of the shooting button exceeds the first set threshold, completing video shooting.

11. A non-transitory computer readable storage medium storing one or more programs, wherein the one or more programs comprise instructions which, when executed by a mobile device comprising a touchscreen and multiple application programs, causes the mobile device to:
   start video shooting on a shooting screen when a long press event of a shooting button is received; and when the long press event ends, and when a long press period of the shooting button does not exceed a first set threshold, complete shooting mixed visual media, wherein the mixed visual media comprises one video clip and at least one static picture, wherein the instructions, when executed by a mobile device comprising a touchscreen and multiple application programs, cause the mobile device to perform an alert operation when the long press period of the shooting button reaches a second set threshold, wherein the second set threshold is less than the first set threshold.

* * * * *